UNITED STATES PATENT OFFICE.

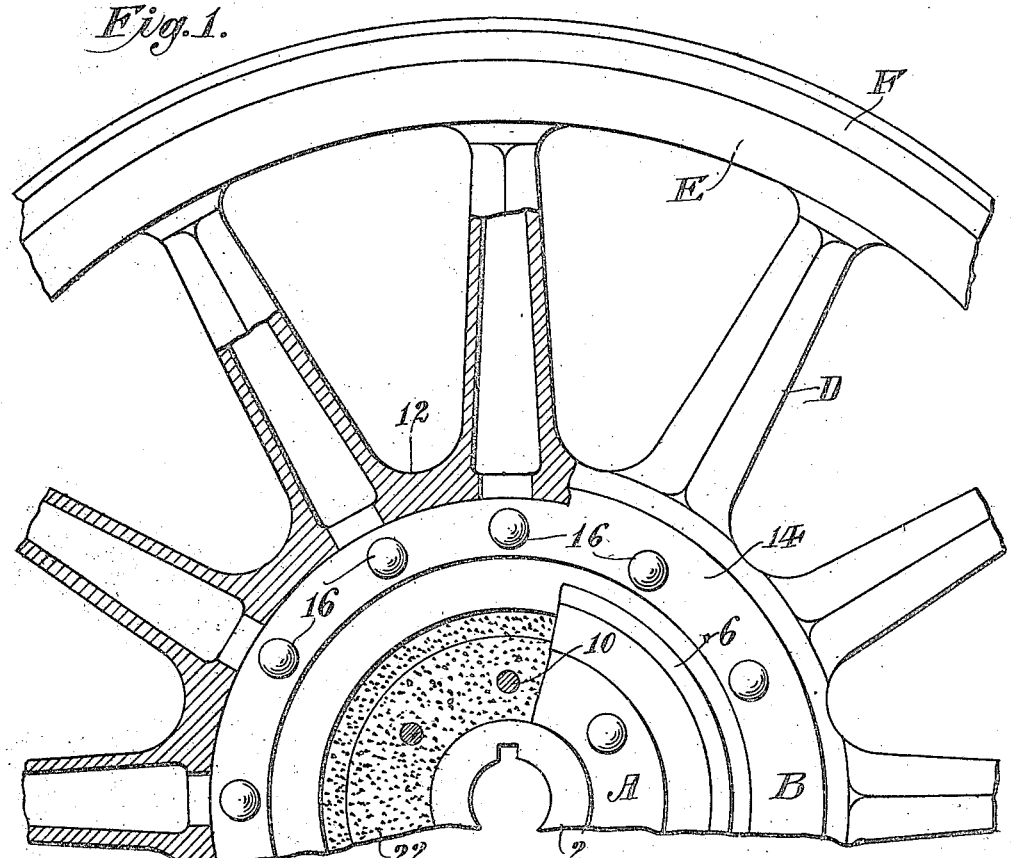
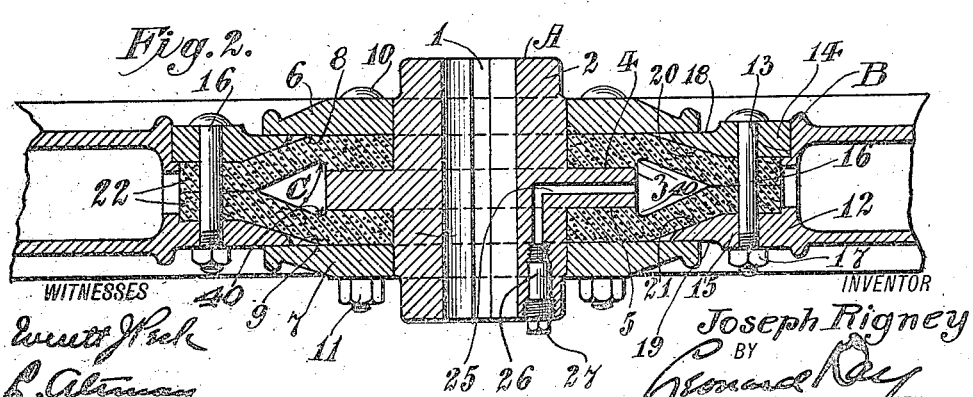

JOSEPH RIGNEY, OF NEW YORK, N. Y.

RESILIENT WHEEL.

1,165,824.  Specification of Letters Patent.  Patented Dec. 28, 1915.

Application filed April 6, 1914. Serial No. 829,736.

*To all whom it may concern:*

Be it known that I, JOSEPH RIGNEY, a citizen of the United States, and a resident of New York city, New York, and whose post-office address is 126 Claremont avenue, in the borough of Manhattan, county, city, and State of New York, have invented certain new and useful Improvements in Resilient Wheels, as set forth in the following specification.

This invention relates to vehicle wheels, more particularly to those adapted for use on automobile trucks, automobiles and the like.

The object of the invention is to minimize the disastrous effects from sudden shocks transmitted from inequalities in the roadway and from the sudden stopping and starting of the power transmission. To this end there is contemplated within the invention the provision of resilient means providing relief against shocks both in torsion in the case of a driving wheel for vehicles and in an axial direction imparted from the roadway in the case of any wheel.

In carrying out the general object of the invention, an important feature is the employment of a pair of massive annular disks of resilient material which are so mounted at their inner portions upon the hub part of the wheel and upon their peripheral portions upon the outer part of the wheel as to provide a strong durable resilient connection against torsion and axial compression between the outer part of the wheel and the hub part of the wheel and at the same time having provisions for the making of an annular pneumatic chamber between the said disks to coöperate in resisting resiliently the radial stresses in the wheel.

More specifically, an object of the invention is the peculiar formation of the outer faces of these annular disks to permit a distortion strain resulting from the expending force of the pneumatic cushion without causing the disks to interfere with the free relative movement of the confining metal parts of the wheel structure.

The invention will be pointed out more particularly in the accompanying claims, which should be read in connection with the illustrative embodiment of the invention described in the following specification, and shown in the accompanying drawings, which form a part of this application, in which like characters designate corresponding parts throughout the several figures and in which—

Figure 1 is a side elevation of a wheel showing a preferred embodiment of my invention; Fig. 2 is a horizontal section through the structure of Fig. 1 looking in an upward direction; and Fig. 3 is a detail medial section through one of the rubber disks.

My invention is particularly advantageous in its application to the driving wheels of automobile trucks, such a wheel being shown in the illustrations.

A and B indicate respectively the inner and outer parts of a two part hub. The inner part A is shown provided with a keyway 1 usual in connection with driving wheels to provide for the keying to the driving shaft, although it should be understood that this hub-part may be fitted with any commercial form of bearing desired so that the same may be serviceable as other than a driving.wheel.

The inner part A comprises a barrel-shaped portion 2 integral with which is an annular flange 3 extending outwardly in a central location and extending like a ring about the entire barrel 2. The opposite faces 4 and 5 of this flange are finished to form a tight joint with rubber. Axially spaced apart from each other and from the central flange 3 are two detachable annular flanges 6 and 7 which fit snugly over the barrel 2 and provide inner parallel faces 8 and 9. The three flanges 3, 6 and 7 are provided with alined perforations in sets to take the clamping bolts 10 which pass through and terminate in suitable nuts 11.

The outer hub part B is radially spaced from the inner part A and comprises an annular structure 12 which may be of cast metal, extending inwardly from which are two axially spaced flanges 14 and 15. One of these flanges is integral with the annular part 12 and the other is removable and adapted to fit against a shoulder formation 13. Alined perforations provide for the reception of suitably spaced bolts 16 fitted with the nuts 17 to complete the assemblement. The flanges 14 and 15 provide axially spaced outer parallel faces 18 and 19 designed to slide against the inwardly directed faces 8 and 9 of the flanges 6 and 7. These flanges 14 and 15 are provided also with inner flaring surfaces 20 and 21.

A pair of free annular disks 22 of any suitable strong resilient material such as rubber, each disk having a central circular opening 23 of a size to fit over the barrel 2, is provided. The inner portion 30 of each disk, which portion should extend out radially an extent equal substantially to the extent of the central flange 3, is of a considerable and of a uniform thickness. The inner face 31 or this portion 30 of each annular disk extends radially outward in the same plane as the inner face 32 of the outer marginal portion 33. The outer face 34, however, of the marginal portion 33 is molded in a plane considerably inward from that of the outer face 35 of the inner or central portion 30. This outer face 34 merges into the outer face 35 in a gentle curve forming the shoulder 24. Thus the portion 33 has only a fraction of the thickness of the central portion 30. This location of the initially concave shoulder 24 on the outside of each disk is purposeful in limiting an outward distortion of the disks from internal air pressure from the pneumatic cushion as presently will be described more fully. Through the metal of the barrel 2 and central flange 3 is provided an air passage 25 leading from the air chamber C formed between the disks 22. It is fitted with a check-valve 26 and safety-plug 27.

In the structure shown the outer part B is an integral casting with the radially extending means shown in the form of hollow spokes D which secure the outer rim E to the rest of the wheel structure. The rim E may be fitted with any suitable tire such as a solid rubber tire F.

In assembling the wheel structure, a pair of the annular disks 22 are slipped over the hub 2, one on one side of the central flange 3, and one on the other side of the central flange 3. This central flange serves as a central spacing member at the mid-portion of the disks. The marginal portions 33 of the two disks are brought together and are clamped with a sufficient degree of compression between the two flanges 14 and 15 through the medium of the bolts and nuts 16 and 17. The flanges 6 and 7 are then clamped against the central portions 30 of the two disks through the medium of the bolts and nuts 10 and 11, the adjustment being such that the central portions of the disks 22 are sufficiently compressed to make an air-tight fit against the central flange 3 and so that the inner faces 8 and 9 of the flanges 6 and 7 are brought snugly against the outer parallel faces 18 and 19 of the flanges 14 and 15. This assemblement prevents all axial play between the outer part of the wheel structure and the hub part of the wheel structure, but permits, so far as framework is concerned, a free relative circumferential and axial movement between the outer and inner parts of the wheel structure. Only the structure of the rubber disks limits the degree of this circumferential and axial movement, except for the aid of the pneumatic cushion which may be formed in any suitable manner within the chamber C. The convenient way of forming this pneumatic cushion is by forcing in air through the valve 26 and duct 25. This compressed air within the chamber C causes an outward strain upon the mid-portions of the annular disks 22 so that the outer face of each disk is pushed out on the locality of the concave shoulder 24 practically to eliminate this concave shoulder on the outer face and produce it anew from distortion at the locality 40 on the inner face of each disk. Thus it is evident that the concave shoulder 24 initially formed on the outer face of each disk permits a sufficient strain in the resilient disks themselves to withstand the bursting force of the pneumatic cushion in the chamber C without forcing the outer faces of the disks too strongly against the flaring faces 20 and 21 of the flanges 14 and 15. As shown in the drawings these disks do not completely fill the space between the flanges 6 and 7. In this manner much chafing and abrasion is eliminated upon the disks, which might otherwise be expected from an axial movement of the outer portion of the wheel structure relatively to the hub portion thereof.

In the structure illustrated both the flanges 6 and 7 are shown non-integral with the hub 2, while fixity against movement of these flanges is accomplished by means of their connection to the fixed central flange 3 through the medium of the bolts 10. Thus the central flange 3 serves as means for anchoring the outer flanges 6 and 7 but should be regarded merely as illustrative means for this purpose, as it is understood that it is necessary that the inner portions of the annular disks need merely to be anchored in any suitable manner.

What is claimed and what is desired to be secured by United States Letters Patent is:—

1. A vehicle wheel comprising two parts, the parts of which are free to move radially and circumferentially in relation to each other, one part having two axially spaced flanges extending radially and having parallel inner faces and the other part having radially extending in an opposite direction axially spaced flanges presenting parallel outer faces to be engaged slidably both radially and circumferentially by said parallel inner faces and also presenting outwardly flaring inner faces extending toward the flanges of said first mentioned part; a pair of massive annular disks of resilient material; means for clamping one pair of said flanges to the margins of said annular disks; means for clamping the other pair of flanges to the outer faces of the inner portions of said disks, whereby said flanges inclose and protect said annular disks.

2. A vehicle wheel comprising two parts, the parts of which are free to move radially and circumferentially in relation to each other, one part having two axially spaced flanges extending radially and having parallel inner faces and the other part having radially extending in an opposite direction axially spaced flanges presenting parallel outer faces to be engaged slidably both radially and circumferentially by said parallel inner faces and also presenting outwardly flaring inner faces extending toward the flanges of said first mentioned part; a pair of massive annular disks of resilient material; means for clamping one pair of said flanges to the margins of said annular disks; means for clamping the other pair of flanges to the outer faces of the inner portions of said disks, whereby said flanges inclose and protect said annular disks; and means for spacing apart the inner margins of said annular disks to leave a chamber between their mid-portions.

3. In a vehicle wheel comprising two parts which are free to move both radially and circumferentially in relation to each other, one being an inner annular part, and the other an outer annular part; means for resiliently connecting said inner and outer parts comprising a pair of massive annular disks of resilient material; flanges relatively engaging each other slidably for confining said annular disks; each of said annular disks initially having a concave shoulder formation on its outer face whereby a distortion strain may be permitted from the interior outward without interfering with the said confining flanges.

In witness whereof, I have signed my name to this specification, in the presence of two subscribing witnesses.

JOSEPH RIGNEY.

Witnesses:
HENRY SCHWED,
LILLIE ALTMAN.